United States Patent
Braband

(10) Patent No.: US 10,257,045 B2
(45) Date of Patent: Apr. 9, 2019

(54) METHOD FOR MONITORING A NETWORK COMPONENT AND ARRANGEMENT COMPRISING A NETWORK COMPONENT AND A MONITORING DEVICE

(71) Applicant: SIEMENS MOBILITY GMBH, Munich (DE)

(72) Inventor: Jens Braband, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 15/562,032

(22) PCT Filed: Mar. 24, 2016

(86) PCT No.: PCT/EP2016/056565
§ 371 (c)(1),
(2) Date: Sep. 27, 2017

(87) PCT Pub. No.: WO2016/156207
PCT Pub. Date: Oct. 6, 2016

(65) Prior Publication Data
US 2018/0109427 A1      Apr. 19, 2018

(30) Foreign Application Priority Data

Mar. 27, 2015   (DE) .................. 10 2015 205 607

(51) Int. Cl.
*H04L 12/24*        (2006.01)
*B61L 15/00*        (2006.01)
(Continued)

(52) U.S. Cl.
CPC ........ *H04L 41/142* (2013.01); *B61L 15/0036* (2013.01); *B61L 27/0005* (2013.01);
(Continued)

(58) Field of Classification Search
CPC ....... H04L 41/142; H04L 43/10; H04L 63/12; B61L 15/0036; B61L 27/0005; G06F 21/57
See application file for complete search history.

(56) References Cited

U.S. PATENT DOCUMENTS 7,302,474 B2   11/2007   Szucs et al.
7,386,735 B2    6/2008   Eitel et al.
(Continued)

FOREIGN PATENT DOCUMENTS

DE    602004001046 T2    4/2007
DE        60123207 T2    9/2007
(Continued)

OTHER PUBLICATIONS

"EN 50159-1: 2001 Railway Applications Communication, Signalling and Processing Systems. Part 1: Safety-related communication in closed transmission systems"; European Standard—EN 50159-1; XP009112743; 2001.

*Primary Examiner* — Afshawn M Towfighi
(74) *Attorney, Agent, or Firm* — Laurence Greenberg; Werner Stemer; Ralph Locher

(57) ABSTRACT

A method for monitoring a network component. The network component performs a calculation checking the correct functionality of the network component using data which is specific to a state of the network component. The calculation result is transmitted to a monitoring device, which checks the state of the network component and the correct functionality of same using the transmitted calculation result. A request message with a parameter that is specific to the request is transmitted from the monitoring device to the network component, and the specific parameter is used by the network component in the calculation process. This enables the monitoring device to ensure that the result transmitted from the network component is actually up-to- (Continued)

date. Errors can be detected to the effect that a malfunction or a failure of the functionality of the network component has occurred.

12 Claims, 1 Drawing Sheet

(51) Int. Cl.
*B61L 27/00* (2006.01)
*G06F 21/57* (2013.01)
*H04L 29/06* (2006.01)
*H04L 12/26* (2006.01)

(52) U.S. Cl.
CPC .............. *G06F 21/57* (2013.01); *H04L 43/10* (2013.01); *H04L 63/12* (2013.01)

(56) References Cited

U.S. PATENT DOCUMENTS

2003/0212932 A1  11/2003  Sauber et al.
2005/0286439 A1  12/2005  Capelle et al.

FOREIGN PATENT DOCUMENTS

| DE | 102008006670 A1 | 8/2009 |
| EP | 1126655 A1 | 8/2001 |
| EP | 2442519 A1 | 4/2012 |

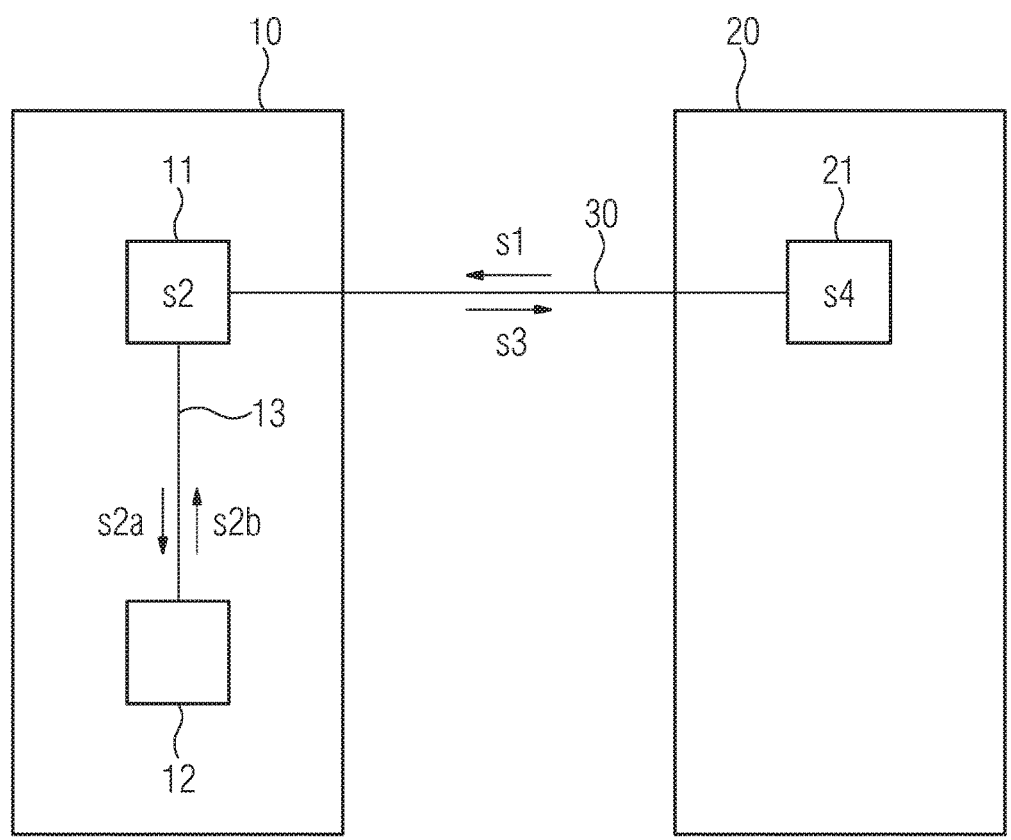

METHOD FOR MONITORING A NETWORK COMPONENT AND ARRANGEMENT COMPRISING A NETWORK COMPONENT AND A MONITORING DEVICE

BACKGROUND OF THE INVENTION

Field of the Invention:

A monitoring of a network component of a communication network may be necessary or expedient for various reasons. The German DIN EN 50159 standard describes the requirements for a safety-relevant communication in transmission systems in the field of railway applications for instance. Within the scope of the architecture predetermined here, it is necessary for safety-relevant applications and/or safety-relevant transmission functions not to monitor such functions or components implemented themselves in the form of a safety-relevant device, on which functions or components the respective safety-relevant application is based.

SUMMARY OF THE INVENTION

The object underlying the present invention is to specify a particularly high-performance and at the same time comparably easily implementable method for monitoring a network component.

This object is achieved in accordance with the invention by a method for monitoring a network component, wherein the network component carries out a calculation which checks the correct functionality of the network component using data which is specific to a state of the network component, the calculation result is transmitted from the network component to a monitoring device and the state of the network component and the correct functionality of the same are monitored by the monitoring device on the basis of the transmitted calculation result.

According to the first step of the inventive method for monitoring a network component, the network component carries out a calculation which checks the correct functionality of the network component using data which is specific to a state of the network component. In such cases the calculation which checks the correct functionality of the network component can in principle be a corresponding calculation of any type. Here the calculation is preferably configured such that at least one part of the safety-relevant functionality of the network component is checked accordingly by the calculation, that a fault in respect of the relevant functionality or functionalities would lead to a distorted calculation result.

Within the scope of the inventive method, the calculation which checks the correct functionality of the network component takes place using data which is specific to a state of the network component. This means that the calculation takes place such that differences in respect of the data which is specific to the state of the network component influences the calculation result with a probability which verges on certainty or is sufficient at least for the respective application.

According to the second step of the inventive method, the calculation result is transmitted from the network component to a monitoring device. In such cases the calculation result can be transmitted in any manner which is known per se. This includes in particular a wired or wireless, for instance radio-based, transmission of the calculation result from the network component to the monitoring device.

According to the third step of the inventive method, the state of the network component and the correct functionality of the same are then checked by the monitoring device on the basis of the transmitted calculation result. This means that an expected value for the calculation result is known to the monitoring device or the monitoring device is itself able to carry out the calculation carried out by the network component and thus to check the calculation result. To this end it is necessary for the data which is used in the calculation and is specific to the state of the network component also to be known to the monitoring device or the monitoring device knows which value the data which is specific to the state of the network component is to have. On the basis of the transmitted calculation result, it is thus possible for the monitoring device to check both the state of the network component and also the correct functionality of the network component. The calculation result determined by the network component then agrees exclusively with the calculation result calculated or expected by the monitoring device if the network component has correctly carried out the calculation which checks its correct functionality. For this purpose it is also necessary for the data which is specific to the state of the network component also accordingly to be correct and for it to correspond to the data expected by the monitoring device.

Consequently the inventive method thus makes it possible to check both the state of the monitored network component and also the correct functionality of the same in a comparably easy manner.

According to a particularly preferred embodiment, the inventive method is developed such that a request message with at least one parameter which is specific to the respective request message is transmitted from the monitoring device to the network component and the network component uses the at least one parameter which is specific to the respective request message when carrying out the calculation which checks the functionality of the network component for the purpose of ensuring that the calculation status is up to date. This offers the advantage that the monitoring device ensures that the calculation result transmitted from the network component has actually been calculated in an up-to-date manner by the network component. In this manner the monitoring device can identify errors to the effect that a malfunction or a failure of the functionality of the network component has occurred, this malfunction or failure is however masked in that the network component accesses a calculation result ascertained at an earlier stage and transmits it to the monitoring device. As a result of a request message with at least one parameter which is specific to the respective request message being transmitted from the monitoring device to the network component and this at least one parameter being used by the network component when carrying out the calculation which checks the functionality of the network component, the update status of the calculation of the calculation result is thus ensured. Here the at least one parameter which is specific to the respective request message is in turn used by the network component analogously to the data which is specific to the state of the network component during the calculation such that there is sufficient certainty that different parameters lead to different calculation results.

The inventive method can preferably also be configured such that the network component carries out a calculation which checks the functionality of the network component in the form of encrypting the data which is specific to the state of the network component, the encrypted data is transmitted from the network component as a calculation result to the monitoring device and the state of the network component and the encryption performed by the network component is checked by the monitoring device on the basis of the transmitted calculation result. In particular, in respect of such network components which are responsible for the encryption in a communication network, it is necessary for safety-relevant applications or components to perform a monitoring of the function of the network component. In this context the cited preferred development of the inventive method makes it possible to check both the calculation in the form of encryption as such and also the state of the network component on the basis of the data which is specific to the state of the network component. Such error cases can also be revealed here for instance, in which the network component is in principle able to correctly encrypt messages, the relevant functionality however per configuration being completely switched off or also switched off in a situation-dependent manner, for example in respect of specific transmitters and/or receivers.

The inventive method can preferably also still be further developed such that a request message with a test key which is specific to the respective request message is transmitted from the monitoring device to the network component and the network component encrypts the data which is specific to the state of the network component for the purpose of ensuring that the calculation status is up to date by means of the test key. Analogously to the preferred development described above in respect of transmitting a request message with at least one parameter which is specific to the respective request message, by transmitting a request message with a test key which is specific to the respective request message from the monitoring device to the network component, is it advantageously possible to ensure that the calculation is carried out in an up-to-date manner in the form of encrypting the network component and a conceivable transmission of a calculation result ascertained at an earlier stage is reliably identified by the monitoring device.

According to a further particularly preferred embodiment of the inventive method, configuration data of the network component is used as data which is specific to the state of the network component. This is advantageous since configuration data is typically well suited to specifying the state of a network component. It is thus possible here for the monitoring device to identify possible errors in the configuration data of the network component on the basis of the calculation result transmitted from the network component.

Alternatively or in addition to the embodiment described above, the inventive method can advantageously also be developed such that status information of the network component is used as data which is specific to the state of the network component. In such cases the status information of the network component can be status information of any type. On the one hand this includes comparably simple status information of the "active" or "inactive" type; on the other hand the status information can also be considerably more detailed and comprehensive. The only prerequisite here is that the relevant status information or expected values for this status information are known by the monitoring device.

Alternatively or in addition to the preferred developments cited above, the inventive method can advantageously also proceed such that data which is specific to software of the network component is used as data which is specific to the state of the network component. Here the data which is specific to software of the network component can be part of the software or also the complete software of the network component. A hash value, which clearly identifies the software or the software state of the network component, can be calculated in a manner known per se by way of the corresponding data for instance. On the basis of the transmitted calculation result, it is thus possible for the monitoring device to identify possible variations in the software of the network component from the software provided or expected by the monitoring device.

The inventive method can preferably also be developed such that the monitoring device and the network component perform an alternating authentication. This is advantageous since the identity of the network component and the monitoring device is ensured here with respect to the respective other component. On the other hand conceivable security problems or possibilities of attack in respect of the monitoring device and/or the network component or the communication between these two components are avoided.

According to a further particularly preferred embodiment of the inventive method, at least one parameter of the network component is transmitted together with the calculation result from the network component to the monitoring device. The corresponding parameter may be the occurrence or frequency of successful login attempts or unauthenticated messages for instance. By additionally transmitting the at least one parameter of the network component to the monitoring device, there is advantageously the possibility, aside from the state of the network component and the correct functionality of the same, for said monitoring device to obtain information relating to parameters which were previously unknown to the monitoring device and to take these into account within the scope of monitoring the network component.

The inventive method can preferably also be configured such that the at least one parameter of the network component to be transmitted from the network component to the monitoring device is communicated by the monitoring device. This offers the advantage that the monitoring device itself can specify with respect to the network component which parameter or parameters is or are to be transmitted from the network component together with the calculation result to the monitoring device.

The inventive method can preferably be configured here such that the at least one parameter comprises an indication relating to error cases registered by the network component. This is advantageous since the monitoring device is able to take the number, type and/or frequency of error cases registered by the network component into account within the scope of monitoring the network component.

The present invention relates further to an arrangement with a network component and a monitoring device.

With respect to the arrangement, the object underlying the present invention is to specify an arrangement which supports a particularly high-performance and at the same time comparably easily implementable method for monitoring a network component.

This object is achieved in accordance with the invention by an arrangement with a network component for carrying out a calculation which checks the correct functionality of the network component by using data which is specific to a state of the network competent and for transmitting the calculation result to a monitoring device, and with the monitoring device for checking the state of the network component and the correct functionality of the same on the basis of the transmitted calculation result.

The advantages of the inventive arrangement correspond substantially to those of the inventive method, so that in this regard reference is made to the corresponding preceding explanations. The same applies in respect of the preferred developments of the inventive arrangement cited below with respect to the correspondingly preferred developments of the inventive method, so that reference is also made in this respect to the corresponding embodiments above.

The inventive arrangement can preferably be embodied such that the monitoring device is embodied to transmit a request message with at least one parameter which is specific to the respective request message to the network component and the network component is embodied to use the at least one parameter which is specific to the respective request message when carrying out the calculation which checks the functionality of the network component ensuring that the calculation status is up to date.

According to a particularly preferred development of the inventive arrangement, this is realized such that the network component is embodied to carry out a calculation which checks the functionality of the network component in the form of encrypting the data which is specific to the state of the network component and to transmit the encrypted data as a calculation result to the monitoring device and the monitoring device is embodied to check the state of the network component and the encryption performed by the network component on the basis of the transmitted comparison result.

According to a further particularly preferred embodiment of the inventive arrangement, the network components and the monitoring device are embodied to carry out the method as claimed.

BRIEF DESCRIPTION OF THE SEVERAL VIEWS OF THE DRAWING

The invention is explained in more detail below on the basis of exemplary embodiments. To this end the FIGURE shows an exemplary embodiment of the inventive arrangement to explain an exemplary embodiment of the inventive method in a schematic diagram.

DESCRIPTION OF THE INVENTION

A network component 10 which has a control device 11, a storage device 12 and an internal communication connection 13 which connects the two can be seen in the FIGURE. Furthermore, a monitoring device 20 which comprises a control device 21 is shown. The control device 21 of the monitoring device 20 is connected to the control device 11 of the network component 10 by way of a communication connection 30. Here the corresponding control devices 11 and 21 may be processors or computing units which are known per se for instance.

Within the scope of the described exemplary embodiment, it may be assumed that the monitoring device 20 is a safety-relevant device, which can be realized for instance according to the corresponding requirements of the DIN EN 50159 standard. With respect to the network component 10, it may be assumed that this safety-relevant cryptographic technique provides, i.e. for instance encrypts messages provided by the monitoring device 20. However in such cases the network component 10 is itself not implemented or realized as a safety-relevant device, so that a fault in the network component 10 can in principle not be ruled out. For this reason it is necessary for the function of the network component 10 to be monitored by the monitoring device 20.

It should be noted that the network component 10 and the monitoring device 20 will generally include both hardware and also software means. As a function of the respective circumstances, there is also the possibility here of the network component 10 and the monitoring device 20 using the same hardware in whole or at least in part and thus being characterized substantially by corresponding software components. In respect of the architecture known from DIN EN 50159, this can take place for instance such that the monitoring device in the form of an additional module or an additional software layer is moved in the safety-relevant transmission function and the safety-relevant cryptographic technique or also between the safety-relevant application and the safety-relevant transmission function.

In order for the monitoring device 20 now to be able to check the functionality of the network component 10 in a particularly reliable and at the same time comparably easy manner, in a first method step or a first message s1 the monitoring device 20 can transmit a request message with at least one parameter which is specific to the respective request message to the network component 10. In such cases the request message corresponds in its function to a type of "safety ping", since a check of the correct functionality of the network component 10 is initiated thereby.

Within the scope of the described exemplary embodiment, it may be assumed that the request message contains a test key which is specific to the respective request message as a parameter which is specific to the respective request message.

The network component 10 now carries out a calculation which checks the correct functionality of the network component by using the data which is specific to a state of the network component 10. This is indicated in the FIGURE by a method step s2 assigned to the control device 11 and the method steps s2a and s2b involving the storage device. As data which is specific to the state of the network component 10, here the control device 11 can query or read out configuration data of the network component 10, status information of the network component 10 and/or data which is specific to software of the network component 10 from the storage device 12.

The network component 10 or its control device 11 now carries out a calculation which checks the functionality of the network component 10 in the form of encrypting the data which is specific to the state of the network component. In such cases the calculation is preferably chosen so that it enables an at least extensive check at least of the safety-relevant function, i.e. as large coverage of functions as possible, of the network component 10. If a complete coverage of functions or a coverage of functions which is sufficient for the respective application is not to be possible by means of a calculation, the results of various calculations can be linked here.

If a subfunctionality of the network component is checked by means of the calculation which checks the correct functionality of the network component, further calculations can be carried out in a corresponding manner within a predetermined or predeterminable failure detection time in order consequently overall to achieve as complete a coverage as possible of at least the safety-relevant functions or functionality of the network component 10.

The encrypted data is transmitted from the network component 10 in a method step s3 as a calculation result to the monitoring device 20. This or its control device 21 now checks the state of the network component 10 and the encryption performed by the network component 10 on the basis of the transmitted calculation result. This means that an extensive check of the functionality of the network component 10 is possible for the monitoring device 20 on the basis of the received calculation result and by taking into account an expected value for this calculation result, which the monitoring device 20 may itself have calculated for instance. This relates both to the correct carrying-out of the encryption by means of the test key and also the value of the data which is specific to the state of the network component. The corresponding check is assigned to the control device 21 in the FIGURE and is identified with the reference character s4.

As a result of the monitoring device 20 in method step s1 having transmitted a request message with the test key which is specific to the relevant request message to the network component 10, it is advantageously ensured that the network component 10 has actually calculated the calculation result in an up-to-date manner and does not possibly access an earlier calculation result. In order to increase security, the monitoring device 20 and the network component 10 preferably also carry out an alternating authentication, which is not shown in the FIGURE for the sake of clarity. Within the scope of the method step s3, at least one parameter of the network component 10 can advantageously be transmitted together with the calculation result from the network component 10 to the monitoring device 20. As a result of the relevant at least one parameter being transmitted directly to the monitoring device 20, it is possible for the latter to obtain extensive information relating to the network component 10. For instance the corresponding parameter can be a specification relating to error cases registered by the network component 10, for instance in the form of the frequency of successful login attempts or the frequency of unauthenticated messages. If in this regard a negative trend results or a threshold value is exceeded, the monitoring device can take an appropriate measure, for instance that a message is output to an application. The network component 10 can preferably be informed by the monitoring device 20, within the scope of the method step s1, which parameter or parameters are to be transmitted from the network component 10 together with the calculation result to the monitoring device 20.

It should be noted that the network component 10 could additionally or alternatively also yield any other functionality. This means that the network component 10 can be any subscriber in a communication network. The method described above also enables such a subscriber to perform an extensive check of the functionality of the subscriber or of the corresponding network component 10. To this end the network component 10 preferably carries out as complex a function as possible as the calculation. This can consist for instance in a hash function being calculated, the start value of which depends on a currently formed code relating to the software and the data which is specific to the state of the network component 10.

The method described above on the basis of exemplary embodiments and the associated arrangement advantageously enable a reliable monitoring of the network components 10 by the monitoring device 20. This is relevant particularly in such cases in which the network component 10 fulfills a safety-relevant function, without however being realized itself as a corresponding safety-relevant device according to the DIN EN 50159 standard for instance. A corresponding, preferably cyclical monitoring process by means of the monitoring device 20 thus advantageously enables such network components 10 also to be used for safety-relevant applications, in the railway sector for instance.

The invention claimed is:
1. A method for monitoring a network component, the method comprising:

using the network component to carry out a calculation which checks a correct functionality of the network component using data that is specific to a state of the network component;
transmitting a calculation result from the network component to a monitoring device; and
using the monitoring device to check the state of the network component and a correct functionality of the network component on a basis of the transmitted calculation result;
using the network component to carry out a calculation which checks the functionality of the network component by encrypting data that is specific to the state of the network component;
transmitting the encrypted data from the network component as a calculation result to the monitoring device;
checking with the monitoring device the state of the network component and the encryption performed by the network component based on the transmitted calculation result;
transmitting a request message from the monitoring device with a test key that is specific to the respective request message to the network component; and
encrypting with the network component the data that is specific to the state of the network component for ensuring that the calculation status is up to date by means of the test key.

2. The method according to claim 1, which comprises:
transmitting a request message with at least one parameter that is specific to the respective request message from the monitoring device to the network component; and
using with the network component the at least one parameter that is specific to the respective request message when carrying out the calculation which checks the functionality of the network component for ensuring that a calculation status is up to date.

3. The method according to claim 1, which comprises using configuration data of the network component as the data that is specific to the state of the network component.

4. The method according to claim 1, which comprises using status information of the network component as the data that is specific to the state of the network component.

5. The method according to claim 1, which comprises using data which is specific to a software of the network component as data that is specific to the state of the network component.

6. The method according to claim 1, which comprises performing an alternating authentication with the monitoring device and with the network component.

7. The method according to claim 1, which comprises transmitting at least one parameter of the network component from the network component together with the calculation result to the monitoring device.

8. The method according to claim 7, which comprises communicating the at least one parameter of the network component to be transmitted from the network component to the monitoring device by the monitoring device.

9. The method according to claim 7, wherein the at least one parameter comprises a specification relating to error cases registered by the network component.

10. An arrangement, comprising:
a network component and a monitoring device;
said network component being configured for carrying out a calculation which checks a correct functionality of the network component using data that is specific to a state of the network component and for transmitting a calculation result to said monitoring device; and said monitoring device being configured for checking the state of the network component and the correct functionality of the network component on a basis of the transmitted calculation result;

wherein said network component and said monitoring device are additionally configured to:

transmit a request message from the monitoring device with a test key that is specific to the respective request message to the network component; and encrypt with the network component the data that is specific to the state of the network component for ensuring that the calculation status is up to date by means of the test key.

11. The arrangement according to claim 10, wherein:

said monitoring device is configured to transmit a request message with at least one parameter that is specific to a respective request message to said network component; and said network component is configured to use the at least one parameter that is specific to the respective request message when carrying out the calculation that checks the functionality of the network component for the purpose of ensuring that a calculation status is up to date.

12. The arrangement according to claim 10, wherein:

said network component is configured to carry out a calculation which checks the functionality of said network component by encrypting the data that is specific to the state of said network component;

said network component is configured to transmit the encrypted data as a calculation result to said monitoring device; and said monitoring device is configured to check the state of the network component and the encryption performed by the network component based on the transmitted calculation result.

\* \* \* \* \*